(12) United States Patent
Koski

(10) Patent No.: US 8,753,430 B2
(45) Date of Patent: Jun. 17, 2014

(54) AFFIXING A SEAL SHEET TO A ROTOR OF A ROTARY VALVE

(75) Inventor: Stephen Jay Koski, Lemont, IL (US)

(73) Assignee: UOP LLC, Des Plaines, IL (US)

( * ) Notice: Subject to any disclaimer, the term of this patent is extended or adjusted under 35 U.S.C. 154(b) by 272 days.

(21) Appl. No.: 13/104,429

(22) Filed: May 10, 2011

(65) Prior Publication Data

US 2012/0285321 A1  Nov. 15, 2012

(51) Int. Cl.
*B01D 53/02* (2006.01)

(52) U.S. Cl.
USPC .......... 95/143; 95/148; 251/314; 137/625.15; 137/625.46

(58) Field of Classification Search
USPC ................ 95/143, 148; 251/314; 137/625.15, 137/625.46
See application file for complete search history.

(56) References Cited

U.S. PATENT DOCUMENTS

| | | |
|---|---|---|
| 2,957,485 A | 10/1960 | Boyd, Jr. |
| 2,985,589 A | 5/1961 | Broughton et al. |
| 3,040,777 A | 6/1962 | Carson et al. |
| 3,192,954 A | 7/1965 | Gerhold et al. |
| 3,201,491 A | 8/1965 | Stine et al. |
| 3,291,726 A | 12/1966 | Broughton |
| 3,422,848 A | 1/1969 | Liebman |
| 3,732,325 A | 5/1973 | Pharis et al. |
| 3,828,815 A | 8/1974 | Botnick |
| 4,614,204 A | 9/1986 | Dolejs |
| 4,633,904 A | 1/1987 | Schumann et al. |
| 5,186,615 A | 2/1993 | Karliner |
| 6,004,518 A | 12/1999 | Green |
| 6,063,161 A | 5/2000 | Keefer et al. |
| 6,537,451 B1 | 3/2003 | Hotier |
| 6,712,087 B2 | 3/2004 | Hill et al. |
| 7,160,367 B2 | 1/2007 | Babicki et al. |
| 7,276,107 B2 | 10/2007 | Baksh et al. |
| 2007/0028971 A1 | 2/2007 | Wagner |
| 2009/0071341 A1 | 3/2009 | Takemasa |
| 2010/0078084 A1 | 4/2010 | Zuck et al. |

OTHER PUBLICATIONS

International Search Report and Written Opinion dated Oct. 29, 2012 for PCT/US2012/036263.

*Primary Examiner* — Christopher P Jones
(74) *Attorney, Agent, or Firm* — Mark R Willis

(57) ABSTRACT

Rotary valves are disclosed, comprising a seal sheet affixed to a rotor. At least some area, namely a "rotor plate surface mating area" is provided, over which a seal sheet anchoring assembly can directly abut, along a planar portion, the rotor plate surface that is in contact with the seal sheet. This advantageously provides an area of direct contacting between the seal sheet anchoring assembly, or one of its components, and the rotor plate, with the abutting surfaces being defined by consistently rigid materials (e.g., metals such as stainless steel) that undergo substantially no deformation, compression, or softening over conditions of normal operation.

15 Claims, 4 Drawing Sheets

AFFIXING A SEAL SHEET TO A ROTOR OF A ROTARY VALVE

FIELD OF THE INVENTION

The invention relates to rotary valves, with particular aspects relating to the manner in which a seal sheet is affixed to a rotor plate at their adjoining surfaces. Representative anchoring assemblies for this purpose have rotor plate surface mating areas that directly abut the rotor plate to provide high integrity (e.g., metal to metal) contacting.

DESCRIPTION OF RELATED ART

Rotary valves have widespread industrial uses, and they are particularly applicable to processes that require simultaneous changing of locations to and from which process streams are conveyed. Most notable among such processes are adsorptive separations of compounds that are preferentially adsorbed, relative to other compounds in an impure mixture, by a solid particulate adsorbent that is normally contained in one or more stationary columns containing adsorbent beds. Movement of the adsorbent is simulated by changing of process stream input and output points. In addition to the feed or impure mixture to be purified, a desorbent, capable of displacing or desorbing the preferentially adsorbed compounds (s) of the impure mixture from the adsorbent, is a second major process input stream to the adsorbent column(s). Likewise, multiple process output streams are withdrawn from the column(s). Among these process output streams, the extract and raffinate streams are, respectively, significantly more and less enriched compared to the feed, in the preferentially adsorbed compounds relative to other feed compounds. By distilling the extract and raffinate streams, desorbent is easily separated from the compounds of the impure mixture, such that the desired component can be recovered, generally at a high purity, from the extract stream. Desorbent recovered by distillation of the extract and raffinate can be reused in the separation process.

A commercially significant example of an adsorptive separation that may be performed using a selective adsorbent in a simulated moving bed process is the separation of para-xylene from a mixture of $C_8$ aromatics that includes ortho- and meta-xylene. Several other types of simulated moving bed adsorptive separations are in use, where typically the selectively adsorbed compounds have the same number of carbon atoms per molecule as the non-selectively adsorbed compounds and also have very similar boiling points, such that separation on the basis relative volatility (i.e., using distillation) or other differences is not practical.

In simulated moving bed processes, a gradual and incremental movement of adsorption, desorption, and isolation zones in the column(s) of adsorbent is achieved by periodically and consecutively advancing the points of introduction of process input streams and points of withdrawal of process output streams, generally along the axial length of the adsorbent columns. For each advance between these relatively uniformly spaced points, the boundaries of the various zone move. The points at which the major input streams enter the adsorbent column and the major output streams are withdrawn from the column are usually separated by at least two or more potential fluid conveyance points that are not being used for either an input or an output process stream. For instance, the feed stream may enter the adsorbent column at one point and flow past seven or more potential introduction/withdrawal points (and through seven distributors/collectors) before reaching the next actual point of fluid introduction or withdrawal that is in use for a process stream, for example the point at which the raffinate stream is removed. The successive movement of the introduction and withdrawal points of the process streams therefore does not affect the performance of the major portion of the primary zones.

Continuous switching of the fluid flows among many different locations of an adsorbent column may be achieved through the use of a multiple-port rotary valve, regulated by a central controller. Further details on the operation of simulated moving beds of adsorbent and the preferred rotary valves are found in U.S. Pat. Nos. 2,985,589; 2,957,485; 3,040,777; 3,192,954; 3,201,491; 3,291,726; 3,732,325; 4,633,904; 6,004,518; 6,063,161; 6,712,087; 7,160,367; 7,276,107; US 2007/0028971; and co-pending U.S. application Ser. No. 12/878,149.

A widely-used type of rotary valve has a planar circular configuration in which a flat ported rotor rotates coaxially on a flat ported stator such that ports in the stator and rotor are aligned or blocked in a predetermined cyclic sequence, depending on how process stream flows are to be routed in any given valve position or index. Sealing between the stator and rotor typically is provided by a flat seal sheet. The seal sheet is secured onto the base of the rotor, at a rotor plate, and slides over flat surfaces of the stator face, particularly a stationary track plate. A high degree of precision is required in the fabrication of the flat, mating surfaces to prevent leakage between them. The integrity of the seal sheet and its attachment to the rotor are also of primary importance in ensuring good mechanical operation of the rotary valve. A complicating factor is the material used for the seal sheet, which must be sufficiently flexible to maintain the proper seal between the rotor and stator, yet able to withstand service under elevated temperatures and pressures. The seal sheet material must be resistant to any permanent changes in its surface during the course of operation, which can compromise the seal. Often non-metal polymers are used, such that sealing occurs between planar surfaces of different materials (e.g., metal and non-metal). Maintenance of the rotary valve and particularly the seal sheet, due to failure and/or wear, results in significant costs associated with process downtime. Such maintenance ultimately limits the overall processing capacity of the rotary valve over a given time period and consequently the profitability of the simulated moving bed process.

Ongoing objectives therefore relate to improving the performance of the seal sheet and minimizing process downtime associated with seal sheet failure.

SUMMARY OF THE INVENTION

The present invention is associated with the manner in which the seal sheet of a rotary valve may be affixed to the rotor plate to maintain good attachment, even under varying operating conditions (e.g., pressures and temperatures). Aspects of the invention are directed to improvements over conventional rotary valves, in which a seal sheet hold down element such as washer is embedded in the seal sheet material, without directly contacting the rotor plate. In rotary valve operations in which the seal sheet is affixed in a manner as described herein, the susceptibility to failure of seal sheet anchoring assemblies, and particularly the loss (or "backing out") of screws or other rotor plate engaging members designed to "stake" or affix the seal sheet to the rotor plate, is significantly reduced. The invention therefore addresses commercially significant issues associated with the strict operating tolerances of the seal sheet, in sealing pressurized fluids as they are continually routed to different rotary valve inlet and outlet ports as the valve indexes or rotates from one valve position to the next. The diminished likelihood of seal sheet failure, due to loosening or complete disengagement of seal sheet anchoring assemblies or their components (e.g., a screw and a button washer), leads to increased on stream operating time and gains in production losses.

Without being bound by theory, the observed failure of seal sheet anchoring assemblies is believed to result from the characteristics of the seal sheet itself, which must have sufficient flexibility to provide fluid-tight seals between connecting metal parts, and must maintain such flexibility and sealing characteristics (i.e., as a gasket material) under variable operating pressures and temperatures. The practice of embedding or recessing components (e.g., a seal sheet hold down element such as a washer) of a seal sheet anchoring assembly in the seal sheet, in the absence of contact of these components with the surface of the adjoining rotor plate, subjects the entire seal sheet anchoring assembly to varying torque requirements. This occurs due to changes in the hardness and compressibility properties of the seal sheet, typically formed of a polymer such as Teflon, under elevated operating temperature and changing operating pressure.

To address this problem, aspects of the invention relate to providing at least some area, namely a "rotor plate surface mating area" over which the seal sheet anchoring assembly can directly abut some portion of the rotor plate surface that is in contact with the seal sheet. This advantageously provides an area of direct contacting between the seal sheet anchoring assembly, or one of its components, and the rotor plate, with the abutting surfaces being defined by consistently rigid materials (e.g., metals such as carbon steel) that undergo substantially no deformation, compression, or softening over conditions of normal operation. The anchoring assembly thereby has surfaces that contact not only facing surfaces of the relatively soft seal sheet, but also facing surfaces of the relatively rigid rotor plate (i.e., at the rotor plate surface mating area). The seal sheet anchoring assemblies, and consequently also the seal sheet itself, are affixed in this manner to the rotor plate with improved integrity. Susceptibility to failure, as a result of changing torque requirements associated with the influence of operating conditions on the properties of the seal sheet material, is significantly reduced or substantially eliminated. Importantly, the seal sheet can perform its sealing (or gasketing) function, by conforming to rotating metal parts as needed under varying operating conditions, without affecting the integrity of the (normally metal-to-metal) contact between abutting surfaces of the seal sheet anchoring assembly. Torque requirements of the seal sheet anchoring assemblies remain constant, thereby addressing the potential problem of detrimental loosening of these assemblies or their components, and/or their backing out of the rotary valve altogether, associated with the industrial operation of conventional rotary valves.

Embodiments of the invention are directed to a rotary valve comprising a rotor plate and a seal sheet that are affixed at adjoining, first rotor plate and first seal sheet surfaces by using at least one seal sheet anchoring assembly, and preferably a plurality of such assemblies. The rotor plate and seal sheet are rotatable with respect to a stationary track plate. The seal sheet anchoring assembly is secured into (or below) the first rotor plate surface (e.g., using threads, in the case of a screw, that bore into the surface). Advantageously, as discussed above, the seal sheet anchoring assembly, for example a component of this assembly such as a seal sheet hold down element, has a rotor plate surface mating area abutting the first rotor plate surface.

Particular embodiments are directed to such rotary valves, further comprising (a) a stator having a stationary track plate in face-to-face, sealing contact with the seal sheet at a second seal sheet surface that is opposite the first seal sheet surface adjoining the rotor plate, and (b) a rotor comprising the rotor plate and further comprising crossover piping for conveying fluids from any of a multitude of fluid ports on a periphery of the stator, to each of several tracks of a track plate.

Further embodiments are directed to a seal sheet anchoring assembly comprising (a) a rotor plate surface mating area for providing, in an abutting relationship, metal-to-metal contact with a first rotor plate surface (b) a seal sheet mating area abutting the seal sheet, and (c) a central securing element extending from above or below a plane of the rotor plate surface mating area for securing into above or below the first rotor plate surface. Yet further embodiments are directed to a method for affixing a seal sheet (e.g., comprising a non-metal such as polymeric material) to a rotor plate (e.g., comprising a metal). The method comprises securing this anchoring assembly into the first rotor plate surface to abut the rotor plate surface mating area with the first rotor plate surface and also to abut the seal sheet mating area with the seal sheet. The seal sheet anchoring assembly may be a single piece or comprise multiple pieces (e.g., both a seal sheet hold down element and a rotor plate engaging member).

Still further embodiments are directed to a seal sheet hold down element comprising (a) a rotor plate surface mating area for providing, in an abutting relationship, metal-to-metal contact with a first rotor plate surface and (b) a seal sheet mating area for providing, in an abutting relationship, metal/non-metal contact with a seal sheet. According to the normal functioning of the seal sheet hold down element, therefore, rotor plate surface mating area and the seal sheet mating area abut the rotor plate and seal sheet, respectively. Typically, both the rotor plate surface mating area and the seal sheet mating area are annular areas in substantially parallel planes (e.g., substantially horizontal planes at differing heights), and particularly coaxial annular areas having a common central axis perpendicular to these planes.

Other embodiments of the invention are directed to adsorptive separation processes comprising continuously flowing feed and desorbent into a rotary valve and to a bed of solid adsorbent and continuously flowing, from the bed of adsorbent and out of the rotary valve, extract and raffinate. Particular processes include the separation of para-xylene from a feed comprising a mixture of ortho-, meta-, and para-xylene. In this case, relative to the feed, the extract is enriched in para-xylene and the raffinate is depleted in para-xylene. The rotary valve advantageously has features as described above, including a seal sheet anchoring assembly, or component of this assembly, having a rotor plate surface mating area abutting at least a portion of the first rotor plate surface. By virtue of these features, the anchoring assembly and seal sheet (generally made of a different material, for example a softer and more flexible polymeric material, than the anchoring assembly) are securely affixed to the rotor plate.

Further embodiments of the invention are directed to a seal sheet anchoring assembly comprising a rotor plate surface mating area. This area advantageously provides metal-to-metal surface contact (e.g., in an abutting, but not physically attached, relationship) with a first surface of the rotor plate, or at least a portion of this surface, namely the surface that faces the seal sheet. The seal sheet anchoring assembly may also include a seal sheet mating area abutting the seal sheet, as well as a securing element, which is generally a portion (e.g., a threaded portion) of the seal sheet anchoring assembly, or component of this assembly, that extends into the rotor plate. For example, the securing element generally extends from the plane (e.g., and extends to below the plane) of the rotor plane surface mating area, for securing into the first rotor plate surface (e.g., in order to secure or attach the anchoring assembly or component of this assembly to the rotor plate by boring into the rotor plate).

These and other aspects and embodiments associated with the present invention are apparent from the following Detailed Description.

BRIEF DESCRIPTION OF THE DRAWINGS

FIGS. 1-4 are to be understood to present an illustration of the invention and/or principles involved. The same reference numbers are used to show the same elements in the various drawings. To aid in understanding the invention, the features shown in FIGS. 1-4 are not necessarily drawn to scale, and some features not essential to this understanding are not shown. As is readily apparent to one of skill in the art having knowledge of the present disclosure, various other embodiments of the invention include the use of rotary valves with seal sheet anchoring assemblies having configurations and components determined, in part, by their specific use.

DETAILED DESCRIPTION

Figure 1:
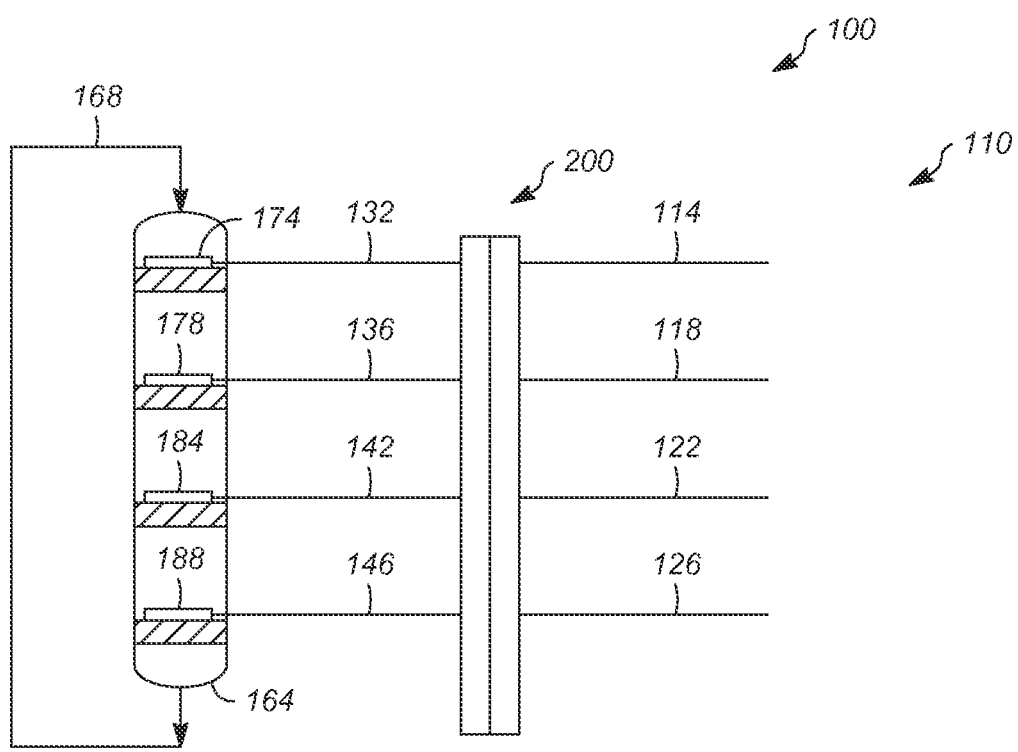
FIG. 1 is a schematic depiction of an exemplary separation system.

A simplified adsorptive separation system 100, utilizing rotary valve 200, is depicted in FIG. 1. System 100 includes a plurality of lines 110 for carrying process streams; a suitable adsorbent, for carrying out a desired separation, contained within at least one adsorber vessel 164; and rotary valve 200. A "stream" or "process stream" refers to a flowing fluid, generally a liquid, comprising organic components such as hydrocarbons. Simulated moving bed adsorptive separation processes utilize one or more adsorbent columns and successive adsorbent bed zones (among which the adsorbent column(s) is/are divided) to which, and from which, such streams may be added or withdrawn using a rotary valve. Representative processes include those for the separation of ethylbenzene or para-xylene from a mixture of $C_8$ aromatics that includes ortho- and meta-xylene; unsaturated fatty acids from saturated fatty acids; acyclic olefins from acyclic paraffins; normal or straight chained aliphatic hydrocarbons from branch chained aliphatic hydrocarbons; normal alcohols from branch chained or cyclic alcohols; straight chained aldehydes containing at least four carbon atoms per molecule from branch chained and cyclic aldehydes; straight chained ketones from branched chain ketones; straight chained aliphatic acids from branch chained or cyclic acids; and oleic acid from its branch chained isomers. A common application of adsorptive separation is the recovery of a particular class of hydrocarbons from a broad boiling point range mixture of two or more classes of hydrocarbons. An example is the separation of $C_{10}$-$C_{14}$ normal paraffins from a mixture which also contains $C_{10}$-$C_{14}$ isoparaffins. An exemplary adsorptive separation system using a rotary valve is described, for example, in U.S. Pat. No. 2,985,589. Typically, type of adsorbent chosen (e.g., an adsorbent comprising a zeolite such as zeolite X or zeolite Y) depends on the components to be separated, and particularly their molecular dimensions.

Rotary valve 200 is depicted in FIG. 1 schematically, without any details, merely to show its relative placement within separation system 100. As shown in FIG. 1, lines 114, 118, 122, and 126 communicate with rotary valve 200, which in turn communicates with adsorber vessel 164 through lines 132, 136, 142, and 146. Adsorbent within adsorber vessel 164 is normally divided into adsorbent beds, for example first bed 174, second bed 178, third bed 184, and fourth bed 188. Typically, adsorber vessel 164 is used in a simulated moving bed process having a line 168 carrying "pumparound" material from the bottom to the top of the series of adsorbent beds to facilitate operations.

Lines 114, 118, 122, and 126 can therefore simultaneously provide a feed stream and a desorbent stream, and withdraw a product (extract) stream and a raffinate stream from rotary valve 200. Similarly, lines 132, 136, 142, and 146 can simultaneously provide the feed and the desorbent streams to particular adsorbent beds within adsorber vessel 164 and withdraw the product and raffinate streams from other adsorbent beds. The particular adsorbent beds to which, and from which, the various process streams are provided and withdrawn depend on the position (or index) of rotary valve 200. Although four actual lines 132, 136, 142, and 146 are illustrated, for simplicity, for conveying process streams to and from the adsorbent beds, generally a significantly greater number of potential lines, for example 20 to 30, are available between adsorber vessel 164 and rotary valve 200, for providing and withdrawing process streams to corresponding adsorbent beds. Therefore, at any given index of rotary valve, streams such as feed stream, desorbent stream, extract stream, and raffinate stream in lines 114, 118, 122, and 126, may be conveyed to and from any four of the greater number (e.g., 20 to 30) of possible adsorbent beds. Furthermore, additional process streams may be provided to or withdrawn from rotary valve, requiring more lines than lines 114, 118, 122, and 126, illustrated in FIG. 1.

Figure 2:
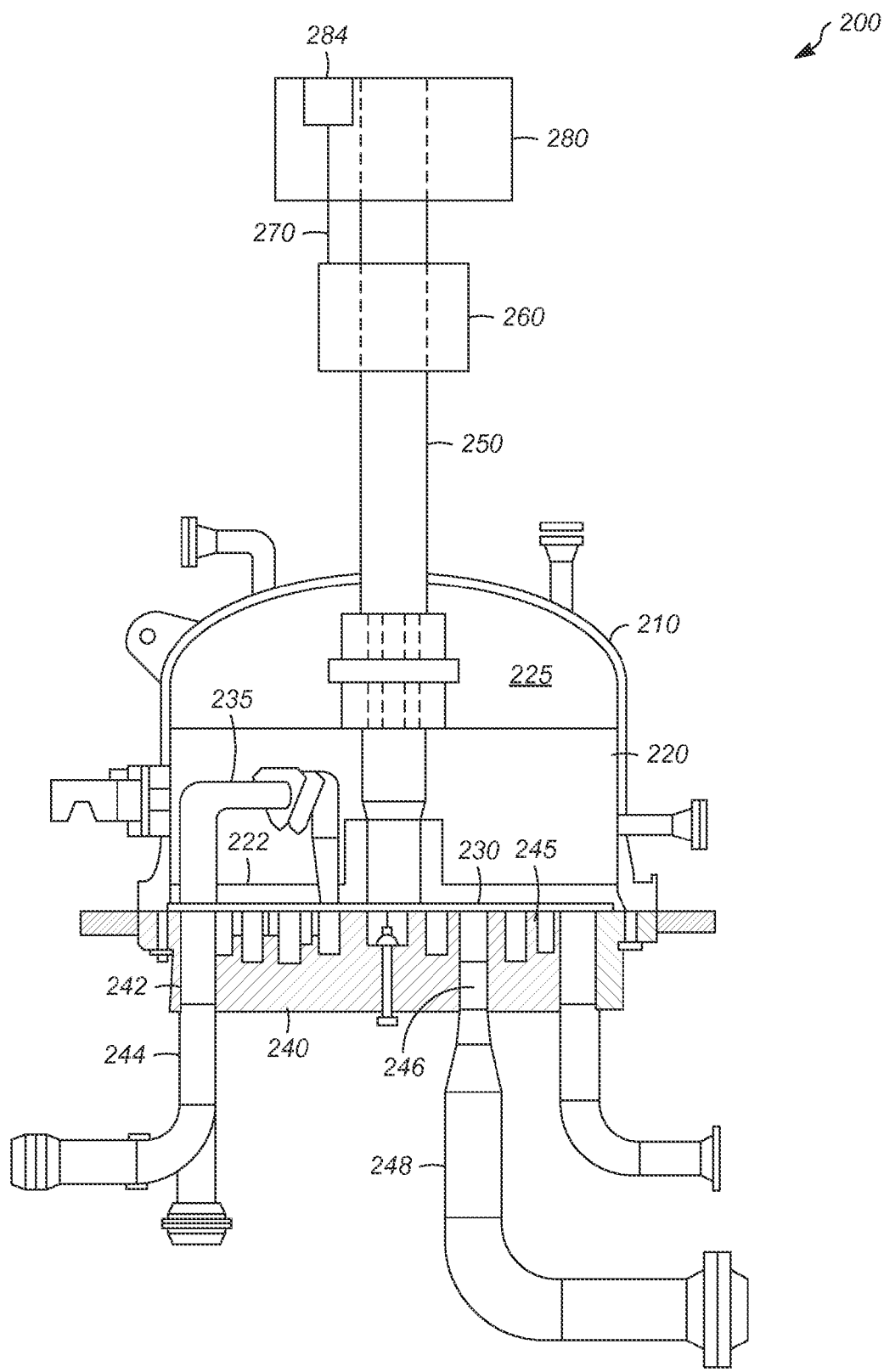
FIG. 2 is a cross-sectional view of a rotary valve with a portion of a shaft depicted in phantom.

FIG. 2 depicts an exemplary rotary valve 200 in further detail. Rotary valve 200 can include casing or dome 210 sealably enclosing rotor 220, which comprises rotor plate 222, and which is affixed to seal sheet 230. Both rotor plate 222 and seal sheet 230 rotate a fraction of a revolution upon indexing rotary valve 200. Indexing refers more particularly to the incremental rotation of rotor plate 222 and seal sheet 230, relative to stator 240, which comprises a stationary track plate 245 in face-to-face contact with seal sheet 230 at adjacent sealing surfaces. Seal sheet 230 therefore creates a liquid tight seal between mating surfaces of track plate 245 and rotor plate 230, thereby ensuring fluid flow only between the aligned ports of rotor 220 and stator 240, for a given valve index, and thereby preventing fluid leakage to (or cross-contamination of) other ports that are not aligned at that index.

Rotor plate 222, seal sheet 230, and track plate 245 may all have a circular geometry with a common central axis. Crossover piping 235 of rotor 220 is used for conveying fluids to or from any of a multitude (e.g., 20 to 30) of fluid ports on periphery of stator 240, depending on the index or position of rotary valve 200, to each of several tracks of track plate 245. Using fluid ports and tracks (in track plate 245) of stator 240, in combination with crossover piping 235 of rotor 220, fluid can flow to and from the rotary valve 200 via, for example, lines 244 and 248 communicating with, respectively, a first and second ports 242, 246. Crossover piping 235 of rotor 220 can therefore form a series of different passageways for fluid flow paths passing through the rotary valve 200, at different index positions, corresponding to different rotational positions of rotor plate 222 and consequently different port alignments. Although two ports 242, 246 are depicted, additional ports may be present depending on the number of fluids being conveyed to and from adsorber vessel (164 in FIG. 1). Thus, rotor plate 222 and track plate 245 can cooperate to define a plurality of slots, openings, or passageways communicating with a plurality of ports 242, 246. Particularly, the plurality of ports 242, 246 are spaced such that the angular rotation of the rotor plate 222 can align different combinations of inlet(s) and outlet(s) to and from rotary valve 200, thereby allowing the exchange of different fluids between rotary valve 200 and adsorber vessel 164 depicted in FIG. 1. Exemplary rotary valves depicting the passages through a rotor are disclosed in, e.g., U.S. Pat. Nos. 3,040,777 and 4,633,904.

Upon indexing rotary valve 200, rotor plate 222 and seal sheet 230 are normally rotated by a device, such as a motor or a hydraulic cylinder that is operatively linked to a cylinder shaft, ratchet arm, and pawl, with the device being in electrical communication with an indexing controller. "Indexing" refers to the incremental rotation of the rotary valve required to align ports, of the entering and exiting fluids, for example to and from a stationary portion of the valve, the stator, at the next successive position with ports (e.g., of crossover piping) of a rotating portion of the valve, the rotor. Alignment of the stationary and rotating portions may be achieved, for example, using crossover piping on the rotating portion that places, depending on the valve index or position, a particular fluid entry or exit port in alignment with a particular track of a track plate on the stationary portion of the valve. In representative embodiments, from about 20 to about 30 possible fluid entry and exit ports may be spaced about the circumference of the rotary valve, such that indexing requires a total rotation from about 12 to about 18 degrees. These ports may, for example, be disposed about an outer perimeter of the stationary portion of the valve, while tracks of the track plate may be disposed concentrically within an inner perimeter of this stationary portion.

In the embodiment shown in FIG. 2, rotary valve 200 also includes drive shaft 250, indexing controller 260, communication link 270, motor 280, and sensor 284. Drive shaft 250 serves to rotate both rotor plate 222 and seal sheet 230, which are affixed at their facing surfaces, for example the first rotor plate surface and the first seal sheet surface, as better described and illustrated below with respect to FIGS. 3 and 4. Seal sheet 230 is therefore in a sealing relationship, at the seal sheet surface (e.g., a second seal sheet surface) that does not adjoin or face rotor plate 222, with a substantially flat seating surface of stator 240. Seal sheet 230 in particular seals horizontally flat portions of track plate 245 between tracks, which abut second seal sheet surface. Rotor plate 222, which may be in the form of a disc, is fixed to drive shaft 250, having a common central axis. Motor 280 is capable of rotating drive shaft 250, and thereby rotor 220 and rotor plate 222, in increments (e.g., from about 12° to about 18° as described above), as required to index rotary valve 200. Incremental rotation may be achieved by hydraulic, electrical, or electromechanical devices.

Casing or dome 210 encloses space 225 about the side of rotor plate 222 and seal sheet 230 that is opposite the side facing stator 240. Pressurized fluid in space 225 is used to control seating pressure on seal sheet 230, and may be added through an opening in dome 210 in order to obtain an acceptable seal between seal sheet 230 and track plate 245. The "seating pressure" therefore refers to the pressure on the rotating portion of the valve, typically the rotor plate and seal sheet, required to maintain an effective seal between mating surfaces of the rotating seal sheet and the stationary track plate of the stator, as discussed above. The seating pressure is often maintained and controlled using, as a pressurized fluid or sealant fluid, a process fluid such as one that acts as a desorbent of a preferentially absorbed compound (e.g., para-xylene), in which an extract is enriched and a raffinate is depleted. The pressurized fluid is present in an enclosed space about one side of the seal sheet, for example the side above the seal sheet. The pressurized fluid may be admitted to and withdrawn from a dome that encloses the rotor plate and is sealably affixed (e.g., bolted) to the stator. In many cases, therefore, the seating pressure is also referred to as the "dome pressure" of the rotary valve.

In order to ensure that a positive sealing force (generally the seating pressure minus the track plate pressure) is exhibited by the seal sheet onto the track plate, the minimum seating pressure is typically from about 2 psig (0.14 kg/cm$^2$) to about 20 psig (0.28 kg/cm$^2$) above a highest track pressure of fluid in the track plate during operation. A maximum seating pressure may be from about 75 psig (5.3 kg/cm$^2$) to about 150 psig (10.5 kg/cm$^2$) above a highest track pressure of fluid in the track plate during operation. In the cases in which the rotary valve is used in adsorptive separations as described above, the highest track pressure is normally the desorbent process steam, carrying desorbent that is capable of displacing or desorbing the preferentially adsorbed compound (e.g., para-xylene) of the mixture of components (e.g., mixed xylene isomers) of the impure feed stream.

Other possibilities for controlling and maintaining a seating pressure include the use of springs. For example, a collar might be added to drive shaft 250 to restrain a cylindrical spring surrounding the drive shaft 250 and pressing on top of rotor 220. A plurality of springs pressing on the top of rotor 220 might be used, with the other ends of the springs being restrained by being affixed to the drive shaft 250 or to the stator 240.

Figure 3:
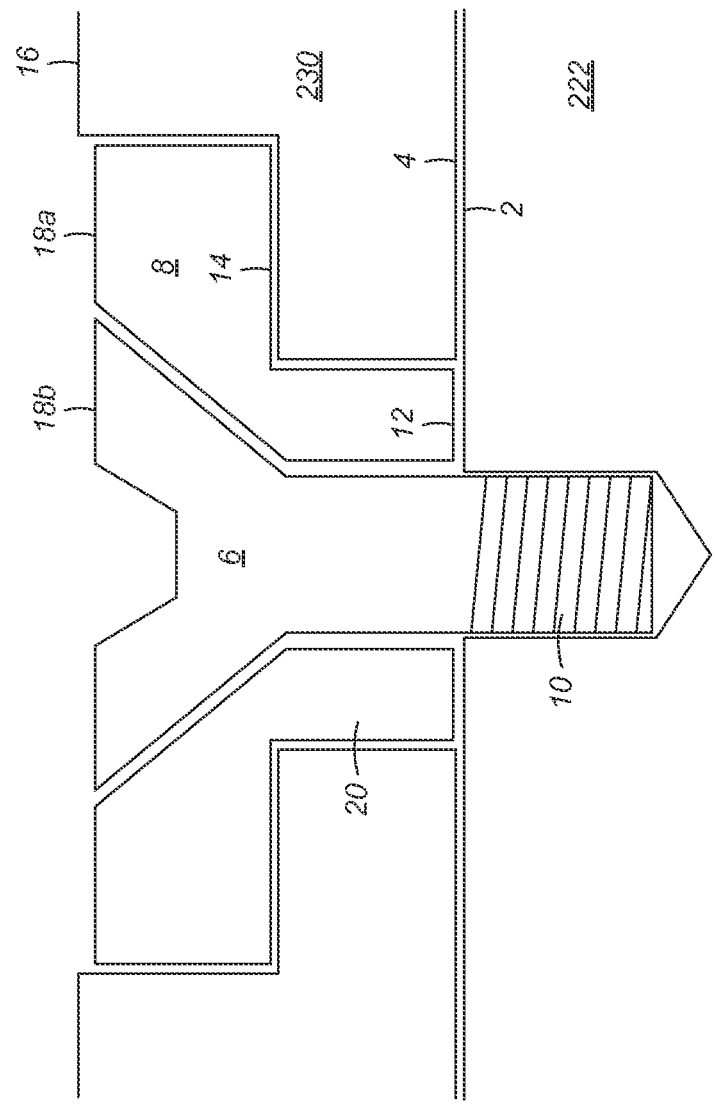
FIG. 3 is a cross-sectional view illustrating the seal sheet of a rotary valve being affixed using an anchoring assembly.
Figure 4:
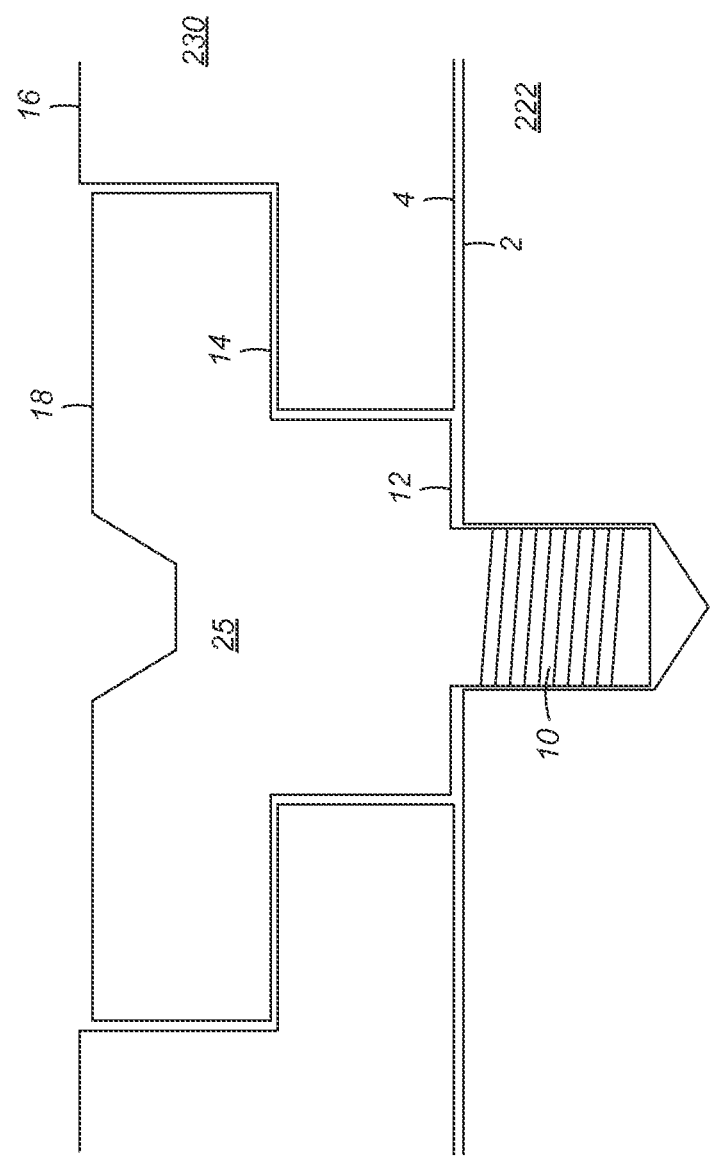
FIG. 4 is a cross-sectional view illustrating the seal sheet of a rotary valve being affixed using a different type anchoring assembly that is a single piece.

As discussed above, embodiments of the invention are associated with the manner in which the seal sheet of a rotary valve may be affixed to the rotor plate, in order reduce or prevent (i) the possibility of loosening and/or loss of seal sheet anchoring assemblies, (ii) seal sheet separation from the rotor plate, and/or (iii) seal sheet failure, any of which may require shutting down of the rotary valve operation (e.g., in a simulated moving bed adsorptive separation process). FIGS. 3 and 4 illustrate in particular the use of seal sheet anchoring assemblies that are used to attach or affix the rotor plate and seal sheet at their adjoining surfaces, according to aspects of the invention. The relative vertical positions of the rotor plate and the seal sheet in FIGS. 3 and 4 are opposite of those in FIG. 2, in which the rotor plate is positioned above the seal sheet. In the embodiments shown in FIGS. 3 and 4, the adjoining surfaces of rotor plate 222 and seal sheet 230 are namely first rotor plate surface 2 and first seal sheet surface 4. As discussed above, both rotor plate 222 and seal sheet 230 are rotatable about a stationary track plate (245 in FIG. 2).

On the first side of the seal sheet, for example the side adjacent the rotor or rotor plate, the seating or dome pressure is often controlled using a control system that maintains at least a minimum seating pressure. The differential pressure across the seal sheet is the difference between the seating or dome pressure and the countering pressure exerted on the second side of the seal sheet, for example from the stationary track plate of the stator. The track plate is therefore typically on a second side of the seal sheet, opposite the first side on which the seating pressure is controlled. The control system controlling the seating pressure may also maintain, in addition to at least a minimum seating pressure, at most a maximum seating pressure. For example, the maximum seating pressure may be from about 75 psig (5.3 kg/cm$^2$) to about 150 psig (10.5 kg/cm$^2$) above a highest track pressure of fluid in the track plate during operation.

FIG. 3 provides a close-up view of a seal sheet anchoring assembly, according to an embodiment of the invention, for affixing rotor plate 222 and seal sheet 230 at first rotor plate surface 2 and adjoining first seal sheet surface 4. The seal sheet anchoring assembly comprises two components, namely rotor plate engaging member 6 and seal sheet hold down element 8, with the rotor plate engaging member 6, according to this embodiment, passing or extending through the seal sheet hold down element 8. Rotor plate engaging member 6 is secured into or below first rotor plate surface 2, by virtue of a securing element 10, namely a threaded portion of rotor plate engaging member 6. Securing element 10 of the seal sheet anchoring assembly extends into rotor plate 222 at a suitable bore depth for securing this anchoring assembly, including both rotor plate engaging member 6 and seal sheet hold down element 8, to rotor plate 222. Aspects of the present invention relate to the advantages, as discussed above, associated with anchoring assemblies having a rotor plate surface mating area 12 abutting first rotor plate surface 2, to provide direct contact between these surfaces, typically defined by rigid materials, compared to the significantly softer materials normally used for seal sheet 230. Therefore, whereas seal sheet 230 is generally non-metallic and formed, for example, of a polymer such as Teflon, rotor plate surface mating area 12 nevertheless can abut first rotor plate surface 2 to provide metal-to-metal contact that ensures rigid anchoring against surfaces that, unlike those of seal sheet 230, are not susceptible to deformation, compression, and/or softening at the elevated pressures and temperatures often encountered in rotary valve service.

Contacting therefore occurs between the rigid, for example metallic, surfaces of the anchoring assembly (for example, seal sheet hold down element 8 of this assembly as shown in the embodiment illustrated in FIG. 3) and first rotor plate surface 2 at rotor plate surface mating area 12. This contacting affixes seal sheet 230 to rotor plate 222 in a manner allowing seal sheet 230 to adequately deform, compress, and/or soften without detrimentally impacting the torque requirements of the seal sheet anchoring assembly and/or rendering this assembly susceptible to backing out. This configuration therefore offers advantages over conventional rotary valves, in which the seal sheet is affixed with components (e.g., washers) embedded entirely in the material of the seal sheet, and not having any surface abutting the rotor plate.

Rotor plate surface mating area 12 may therefore be an annular area, through which rotor plate engaging member 6 and often securing element 10 extend. Whether or not rotor plate surface mating area 12 is annular, securing element 10 may extend centrally through this area, such that its axis substantially coincides with a line extending through the center of, and perpendicular to the plane of, this area. To obtain the desired, high integrity functioning of seal sheet anchoring assembly, the rotor plate surface mating area (e.g., an annular area) preferably represents a significant proportion of, and often exceeds, the bore area used for securing the anchoring assembly into first rotor plate surface 2, as described above. This bore area is namely the cross-sectional area of securing element 10 (e.g., a threaded screw portion). According to particular embodiments of the invention, the ratio of the rotor plate surface mating area to this bore area is typically at least about 0.5:1 (e.g., in the range from about 0.5:1 to about 50:1), and is often at least about 1:1 (e.g., in the range from about 1:1 to about 25:1). In addition, attachment of seal sheet 230 to rotor plate 222 is achieved at least partly using seal sheet mating area 14, defined by abutting surfaces of seal sheet anchoring assembly (e.g., seal sheet hold down element 8 of this assembly) and seal sheet 230. As shown in the embodiment in FIG. 3, seal sheet hold down element 8, as a component of the seal sheet anchoring assembly, has seal sheet mating area 14 abutting seal sheet 230. Seal sheet mating area 14 is recessed with respect to second seal sheet surface 16 for sealing against a stationary track plate (245 in FIG. 2). Second seal sheet surface 16 is namely opposite first seal sheet surface 4 that adjoins rotor plate 222.

Both rotor plate surface mating area 12 and seal sheet mating area 14 are annular areas (e.g., coaxial inner and outer annular areas, respectively) in this embodiment, although other geometries are possible, including oval and polygonal (e.g., square) geometries having open central sections. The term "coaxial" refers to a common axis passing through the center of the rotor plate surface mating area 12 and seal sheet mating area 14, perpendicular to the planes of these areas, which are normally substantially parallel. Additionally, both rotor plate surface mating area 12 and seal sheet mating area 14 may be in substantially parallel planes, for example in horizontal planes as shown in the embodiment of FIG. 3. Secure attachment of seal sheet 230 to rotor plate 222 is generally obtained using ratios of the seal sheet mating area to the bore area, in the same ranges as discussed above with respect to the ratios of the rotor plate surface mating area to the bore area. As also shown in the embodiment of FIG. 3, the seal sheet anchoring assembly, and in particular both seal sheet hold down element 8 and rotor plate engaging member 6, have exposed surfaces 18a, 18b (i.e., surfaces that are exposed when the rotor plate and track plate are separated) that are substantially flush with second seal sheet surface 16. According to some embodiments, exposed surface 18b of rotor plate engaging member 6 may be slightly recessed relative to second seal sheet surface. In case of wearing down of seal sheet 230, this avoids direct contact between a relatively harder metal, of which rotor plate engaging member 6 is normally constructed, and the stationary track plate (245 in FIG. 2), which can become scratched or otherwise flawed from such contact, adversely affecting its performance. In contrast, hold down element 8 is normally constructed of a relatively softer metal or metal alloy such as brass, which is less damaging to the surface of stationary track plate. The two-piece seal sheet anchoring assembly according to the embodiment of FIG. 3 therefore beneficially allows seal sheet hold down element 8 and rotor plate engaging member 6 to be constructed of different materials, tailored to the functions of each of these components. A relatively harder metal of rotor plate engaging member 6 provides a secure attachment, via securing element 10, with rotor plate 222. According to particular embodiments, both rotor plate engaging member 6 and rotor plate 222 are constructed of carbon steel.

A particular seal sheet anchoring assembly according to FIG. 3 comprises a screw, as a rotor plate engaging member, and a modified washer having a shoulder portion 20 extending parallel to the rotor plate engaging member, or otherwise parallel to securing element 10, such that shoulder portion 20 can provide rotor plate surface mating area 12, and in particular desired metal-to-metal contact between the seal sheet anchoring assembly and the rotor plate. In general, rotary valves according to embodiments of the invention comprise a plurality of anchoring assemblies described herein, each of which may have a single component or piece, or otherwise multiple components or pieces (e.g., a seal sheet hold down element and a rotor plate engaging member), with an important consideration being the ability of such anchoring assemblies to provide a rotor plate mating area 12 for contacting surfaces that do not include surfaces of the seal sheet. According to particular embodiments, therefore exemplary rotary valves comprise a plurality of seal sheet anchoring assemblies secured into the first rotor plate surface and having rotor plate surface mating areas abutting the first rotor plate surface.

FIG. 4 depicts a representative embodiment in which anchoring assembly 25, rather than comprising separate seal sheet hold down element (20 in FIG. 3) and rotor plate engaging member (6 in FIG. 3), is a single piece. It is possible for such anchoring assembly 25 to nevertheless provide both seal sheet mating area 14 and rotor plate surface mating area 12, as in the embodiment depicted in FIG. 3. Rotor plate surface mating area 12 may abut first rotor plate surface 2 to provide, for example, metal-to-metal contact. Seal sheet anchoring assembly 25, according to the embodiment shown in FIG. 4, may include securing element 10 that functions in the same manner as discussed above with respect to the embodiment shown in FIG. 3. Securing element 10, may therefore be a disposed centrally with respect to seal sheet anchoring assembly 25 and extend from (e.g., above or below) the plane of the rotor plate surface mating area 12 for securing into (e.g., above or below) first rotor plate surface 2. Characteristics of seal sheet anchoring assemblies discussed above, such as ratios of the rotor plate surface mating area to the bore area and ratios of the seal sheet mating area to the bore area, also apply to the embodiment shown in FIG. 4. Other features discussed above with respect to seal sheet anchoring assemblies comprising both a rotor plate engaging member and a seal sheet hold down element, as opposed to a single piece, similarly apply to this latter case, according to the embodiment shown in FIG. 4. Both rotor plate surface mating area 12 and seal sheet mating area 14 may therefore be annular, and seal sheet mating area 14 may be recessed into second seal sheet surface 16, opposite first seal sheet surface 4. Second seal sheet surface 16, for sealing with a stationary track plate, may be substantially flush with exposed surface 18 of the seal sheet anchoring assembly 25. According to the embodiment shown in FIG. 4, securing element 10, may be threaded and integral with seal sheet anchoring assembly 25, rather than part of a separate rotor plate engaging member (6 in FIG. 3) extending though a separate seal sheet hold down element (8 in FIG. 3). These components (6 and 8 in FIG. 3) are therefore essentially combined (or fused) into the single piece seal sheet anchoring assembly 25 depicted in the embodiment of FIG. 4.

Seal sheet anchoring assemblies according to any of the above embodiments, for example those shown in FIGS. 3 and 4, may be used to secure a seal sheet (e.g., a non-metallic material such as a polymer) to a rotor plate in a rigid manner to provide the advantages discussed above. Preferably a plurality of such seal sheet anchoring assemblies are used, and preferably these seal sheets and rotor plates are incorporated into rotary valves as described above. Representative rotary valves comprise (a) a stator comprising a stationary track plate in face-to-face, sealing contact with the seal sheet at a second seal sheet surface that is opposite the first seal sheet surface adjoining the rotor plate, and (b) a rotor comprising the rotor plate and further comprising crossover piping for conveying fluids from any of a multitude of fluid ports on a periphery of the stator, to each of several tracks of the track plate. However, although rotary valve 200 is depicted in FIGS. 1 and 2, it should be understood that the embodiments disclosed herein can be applicable to other valves that convey a plurality of streams to and from various locations, for example, along the axial length of an adsorber vessel containing a plurality of beds of adsorbent.

Overall, aspects of the invention relate to a seal sheet anchoring assembly comprising a rotor plate surface mating area for providing, in an abutting relationship, metal-to-metal contact with a first rotor plate surface. Such anchoring assemblies may further comprise, as described above, a seal sheet mating area abutting the seal sheet and/or a securing element extending from the plane of the rotor plate surface mating area for securing into the first rotor plate surface. Other aspects of the invention relate to a seal sheet hold down element comprising a rotor plate surface mating area for providing, in an abutting relationship, metal-to-metal contact with a first rotor plate surface. The seal sheet hold down element may also comprise a seal sheet mating area for providing, in an abutting relationship, metal-to-non-metal (e.g., metal-to-polymer) contact with a seal sheet.

In view of the present disclosure, it will be seen that several advantages may be achieved and other advantageous results may be obtained. Those having skill in the art, with the knowledge gained from the present disclosure, will recognize that various changes could be made in the above methods without departing from the scope of the present invention. Mechanisms used to explain theoretical or observed phenomena or results, shall be interpreted as illustrative only and not limiting in any way the scope of the appended claims.

The invention claimed is:

1. A rotary valve comprising:
   a rotor plate and a seal sheet affixed at adjoining, first rotor plate and first seal sheet surfaces, using at least one seal sheet anchoring assembly,
   wherein the rotor plate and seal sheet are rotatable about a stationary track plate, and wherein the seal sheet anchoring assembly is secured into the first rotor plate surface and has a rotor plate surface mating area abutting the first rotor plate surface that is in contact with the seal sheet surface.

2. The rotary valve of claim 1, wherein a ratio of the rotor plate surface mating area to a bore area for securing the anchoring assembly into the first rotor plate surface is at least about 0.5:1.

3. The rotary valve of claim 2, wherein the ratio of the rotor plate surface mating area to the bore area is at least about 1:1.

4. The rotary valve of claim 1, wherein the seal sheet anchoring assembly has a seal sheet mating area abutting the seal sheet.

5. The rotary valve of claim 4, wherein the rotor plate surface mating area and the seal sheet mating area are annular.

6. The rotary valve of claim 4, wherein the seal sheet mating area is recessed into a second seal sheet surface for sealing against a stationary track plate.

7. The rotary valve of claim 6, wherein the seal sheet anchoring assembly has an exposed surface substantially flush with the second seal sheet surface.

8. The rotary valve of claim 1, wherein the seal sheet anchoring assembly is a single piece.

9. The rotary valve of claim 1, wherein the seal sheet anchoring assembly comprises a rotor plate engaging member passing through a seal sheet hold down element.

10. The rotary valve of claim 9, wherein the rotor plate engaging member comprises a securing element that is threaded.

11. The rotary valve of claim 1, wherein the rotor plate surface mating area abuts the first rotor plate surface to provide metal-to-metal contact.

12. The rotary valve of claim 11, wherein the seal sheet is non-metallic.

13. The rotary valve of claim 12, wherein the seal sheet is formed of a polymer.

14. The rotary valve of claim 1, comprising a plurality of seal sheet anchoring assemblies secured into the first rotor plate surface and having rotor plate surface mating areas abutting the first rotor plate surface.

15. The rotary valve of claim 14, further comprising:
(a) a stator comprising a stationary track plate in face-to-face, sealing contact with the seal sheet at a second seal sheet surface that is opposite the first seal sheet surface adjoining the rotor plate, and
(b) a rotor comprising the rotor plate and further comprising crossover piping for conveying fluids from any of a multitude of fluid ports on a periphery of the stator, to each of several tracks of the track plate.

* * * * *